(12) United States Patent
Yang et al.

(10) Patent No.: US 11,320,927 B2
(45) Date of Patent: May 3, 2022

(54) CONTROL SYSTEM FOR A TOUCH DEVICE AND METHOD THEREOF

(71) Applicant: ELAN MICROELECTRONICS CORPORATION, Hsin-Chu (TW)

(72) Inventors: Hsueh-Wei Yang, Zhubei (TW); Tuan-Ying Chang, Tainan (TW); Chang-Ru Chen, Changhua (TW); Tien-Wen Pao, Zhubei (TW); Pin-Jung Chung, Taoyuan (TW)

(73) Assignee: ELAN MICROELECTRONICS CORPORATION, Hsin-Chu (TW)

( * ) Notice: Subject to any disclaimer, the term of this patent is extended or adjusted under 35 U.S.C. 154(b) by 79 days.

(21) Appl. No.: 16/868,956

(22) Filed: May 7, 2020

(65) Prior Publication Data

US 2020/0356209 A1 Nov. 12, 2020

Related U.S. Application Data

(60) Provisional application No. 62/844,744, filed on May 8, 2019.

(30) Foreign Application Priority Data

Nov. 12, 2019 (TW) .................................. 108141063
Apr. 1, 2020 (TW) .................................. 109111097

(51) Int. Cl.
  *G06F 3/041* (2006.01)
  *G06N 20/00* (2019.01)
(52) U.S. Cl.
  CPC ........ *G06F 3/0416* (2013.01); *G06F 3/04164* (2019.05); *G06N 20/00* (2019.01)

(58) Field of Classification Search
  USPC .................. 345/173, 156, 158, 174; 702/188
  See application file for complete search history.

(56) References Cited

U.S. PATENT DOCUMENTS

| 2017/0132496 | A1* | 5/2017 | Shoaib | .................. | G06N 3/063 |
| 2018/0150956 | A1* | 5/2018 | Kao | .................... | G06K 9/4628 |
| 2018/0189466 | A1* | 7/2018 | Raviv | .................. | G06N 3/0454 |
| 2019/0012768 | A1* | 1/2019 | Tafazoli Bilandi | ....... | G06T 7/50 |

(Continued)

FOREIGN PATENT DOCUMENTS

| CN | 107656644 A | 2/2018 |
| CN | 107797751 A | 3/2018 |

(Continued)

OTHER PUBLICATIONS

Taiwan Examination Report dated Mar. 31, 2021, as issued in corresponding TW Patent Application No. 109111097, 9 pages.

*Primary Examiner* — Thuy N Pardo
(74) *Attorney, Agent, or Firm* — Muncy, Geissler, Olds & Lowe, P.C.

(57) ABSTRACT

A control system applicable to a touch device is provided. The touch device includes a touch sensor. The control system comprises a sensing circuit, configured to sense the touch sensor and generate a plurality of sensing values; a processor, configured to generate a sensing image according to the plurality of sensing values; and a convolutional neural network, configured to process the sensing image to generate feature information and generate identification information according to the feature information for determining a status of the touch sensor.

32 Claims, 11 Drawing Sheets

(56) References Cited

U.S. PATENT DOCUMENTS

| | | | |
|---|---|---|---|
| 2019/0102671 A1* | 4/2019 | Cohen | G06F 16/17 |
| 2019/0146478 A1* | 5/2019 | Cella | B62D 15/0215 |
| | | | 702/188 |
| 2019/0197420 A1* | 6/2019 | Singh | G06F 17/16 |
| 2019/0385076 A1* | 12/2019 | Mudie | G06N 7/00 |
| 2020/0033937 A1* | 1/2020 | Erivantcev | G06F 3/012 |
| 2020/0134833 A1* | 4/2020 | Biswas | G06V 10/267 |
| 2020/0196972 A1* | 6/2020 | Zhou | A61B 6/5205 |
| 2020/0205745 A1* | 7/2020 | Khosousi | A61B 5/7275 |
| 2020/0302265 A1* | 9/2020 | Wang | G06N 3/04 |
| 2020/0311948 A1* | 10/2020 | Rhodes | G06T 7/215 |
| 2020/0364867 A1* | 11/2020 | Georgescu | G06N 3/08 |
| 2020/0372276 A1* | 11/2020 | Son | G06N 3/08 |
| 2021/0038102 A1* | 2/2021 | Boleyn | G06N 20/00 |
| 2021/0216824 A1* | 7/2021 | Ling | G06K 9/342 |
| 2021/0264217 A1* | 8/2021 | Strong | G06K 9/6857 |
| 2021/0290193 A1* | 9/2021 | Zhou | A61B 6/5205 |

FOREIGN PATENT DOCUMENTS

| | | |
|---|---|---|
| CN | 108960405 A | 12/2018 |
| TW | 201626188 A | 7/2016 |
| TW | I654541 B | 3/2019 |

\* cited by examiner

CONTROL SYSTEM FOR A TOUCH DEVICE AND METHOD THEREOF

This application claims priority for the U.S. provisional patent application No. 62/844,744 filed on 8 May 2019, and Taiwan (R.O.C.) patent application no. 108141063 filed on 12 Nov. 2019, and Taiwan (R.O.C.) patent application no. 109111097 filed on 1 Apr. 2020, the content of which is incorporated by reference in its entirety.

BACKGROUND OF THE INVENTION

Field of the Invention

The present invention relates to a control system for touch device and a method thereof. More particularly, the present invention is related to a control system having convolutional neural network (CNN) and a method thereof.

Description of the Prior Art

In a touch device, it is necessary to have a determination mechanism for recognizing a category of an object which is in contact with the touch device or a status of the touch device. FIG. 1 to FIG. 4 show a variety of sensing images generated by the touch device corresponding to different status or different category of the object. The sensing image includes a variety of sensing values corresponding to different locations of the touch device. FIG. 1 shows a sensing image caused by a water drop. FIG. 2 shows a sensing image caused by an NFC (Near-Field Communication) card. FIG. 3 shows a sensing image caused by a floating metal object. FIG. 4 shows a sensing image caused by a finger when the touch device is in an abnormal status caused by noise. The touch device needs to determine a category of the object which is in contact with the touch device or a status of the touch device according to the sensing image which is sensed by the touch device, so as to perform corresponding operations. For example, when a touch object is determined as a non-operation one, then the operations of the object is ignored. Alternatively, when it is determined that the touch device is in an abnormal status, the touch device is recalibrated.

SUMMARY OF THE INVENTION

One major objective in accordance with the present invention is to provide a control system using convolutional neural network (CNN) and a method thereof which are applicable to a touch device.

According to one embodiment of the present invention, a control system for a touch device comprises: a sensing circuit, configured to sense a touch sensor of the touch device and generate a plurality of sensing values; a processor, electrically connected to the sensing circuit and configured to generate a sensing image according to the plurality of sensing values; and a convolutional neural network, configured to process the sensing image to generate feature information and generate identification information according to the feature information. The processor determines a status of the touch sensor according to the identification information.

According to one embodiment of the present invention, a control system for a touch device comprises: a sensing circuit, configured to sense a touch sensor of the touch device and generate a plurality of sensing values; a processor, electrically connected to the sensing circuit and configured to generate a sensing image according to the plurality of sensing values, wherein the processor further performs an object segmentation process to the sensing image to determine a sub-image; and a convolutional neural network, configured to process the sub-image to generate feature information and generate identification information according to the feature information. The processor determines a category of an object according to the identification information.

According to one embodiment of the present invention, a control system for a touch device comprises: a sensing circuit, configured to sense a touch sensor of the touch device and generate a plurality of sensing values; a processor, electrically connected to the sensing circuit and configured to generate a sensing image according to the plurality of sensing values; a convolutional neural network, configured to process the sensing image to generate feature information and generate identification information according to the feature information; and a host, coupled to the processor to receive the sensing image. The host determines a status of the touch sensor according to the identification information.

According to one embodiment of the present invention, a control system for a touch device comprises: a sensing circuit, configured to sense a touch sensor of the touch device and generate a plurality of sensing values; a processor, electrically connected to the sensing circuit and configured to generate a sensing image according to the plurality of sensing values; a convolutional neural network, configured to process a sub-image to generate feature information and generate identification information according to the feature information; and a host, coupled to the processor and configured to determine a category of an object according to the identification information. The host or the processor performs an object segmentation process to the sensing image to generate the sub-image.

According to one embodiment of the present invention, a method applicable to a touch device comprises the following steps: obtaining a sensing image of a touch sensor of the touch device, wherein the sensing image comprises a plurality of sensing values; processing the sensing image by a convolutional neural network to generate feature information and generate identification information according to the feature information; and determining a status of the touch sensor according to the identification information.

According to one embodiment of the present invention, a method applicable to a touch device, comprises the following steps: obtaining a sensing image of a touch sensor of the touch device, wherein the sensing image comprises a plurality of sensing values; performing an object segmentation process to the sensing image to determine a sub-image; processing the sub-image by a convolutional neural network to generate feature information and generate identification information according to the feature information; and determining a category of an object according to the identification information.

The present invention utilizes the convolutional neural network to recognize a category of a contact object or a status of the touch device, and has advantages of high efficiency, convenience and precise accuracy.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
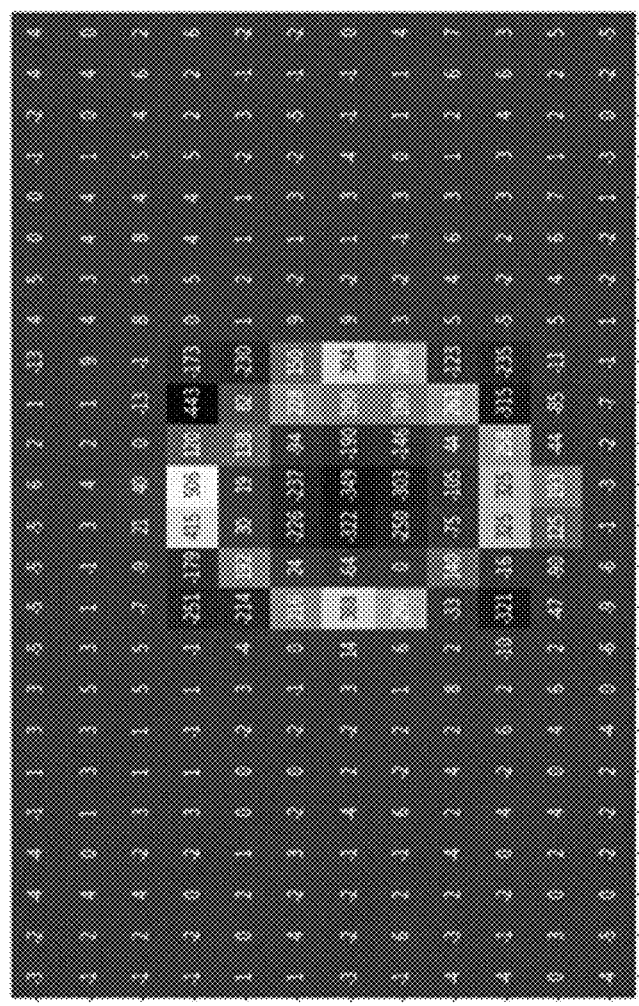
FIG. 1 shows a sensing image caused by a water drop.
Figure 2:
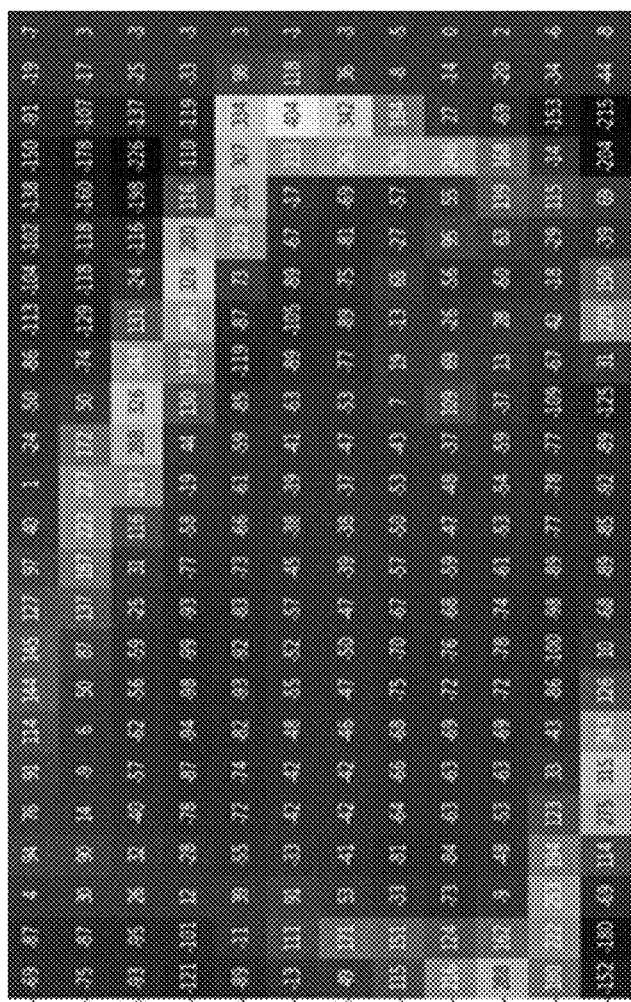
FIG. 2 shows a sensing image caused by an NFC card.
Figure 3:
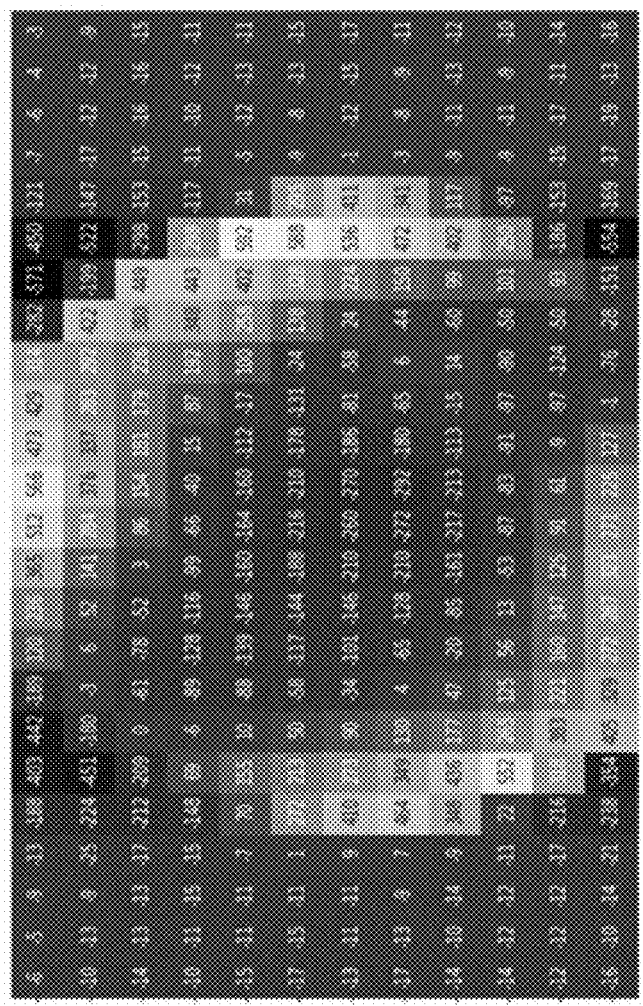
FIG. 3 shows a sensing image caused by a floating metal object.
Figure 4:
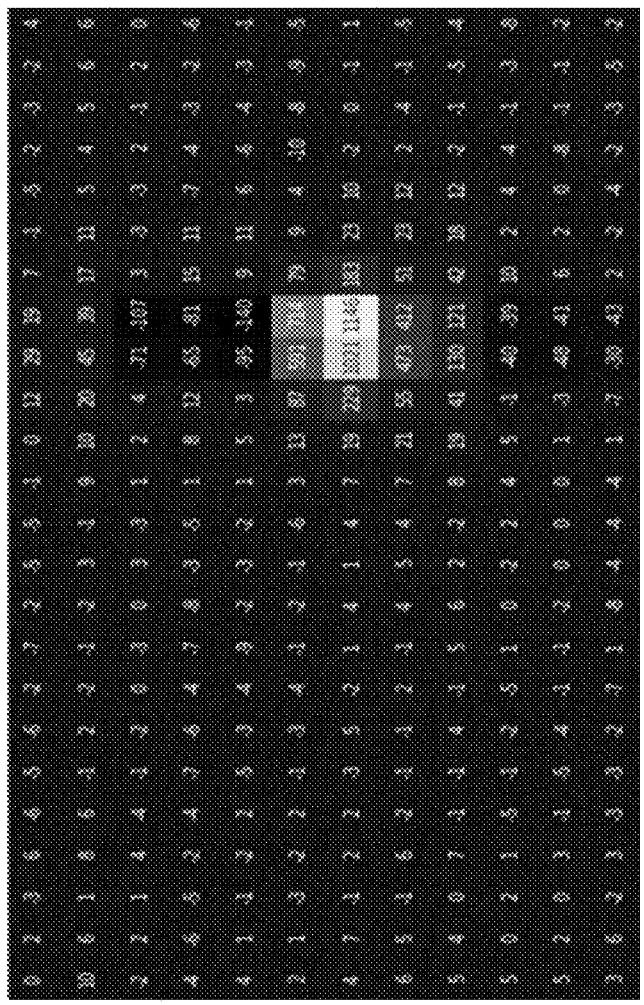
FIG. 4 shows a sensing image caused by a finger when the touch device is in an abnormal status caused by noise.
Figure 5:
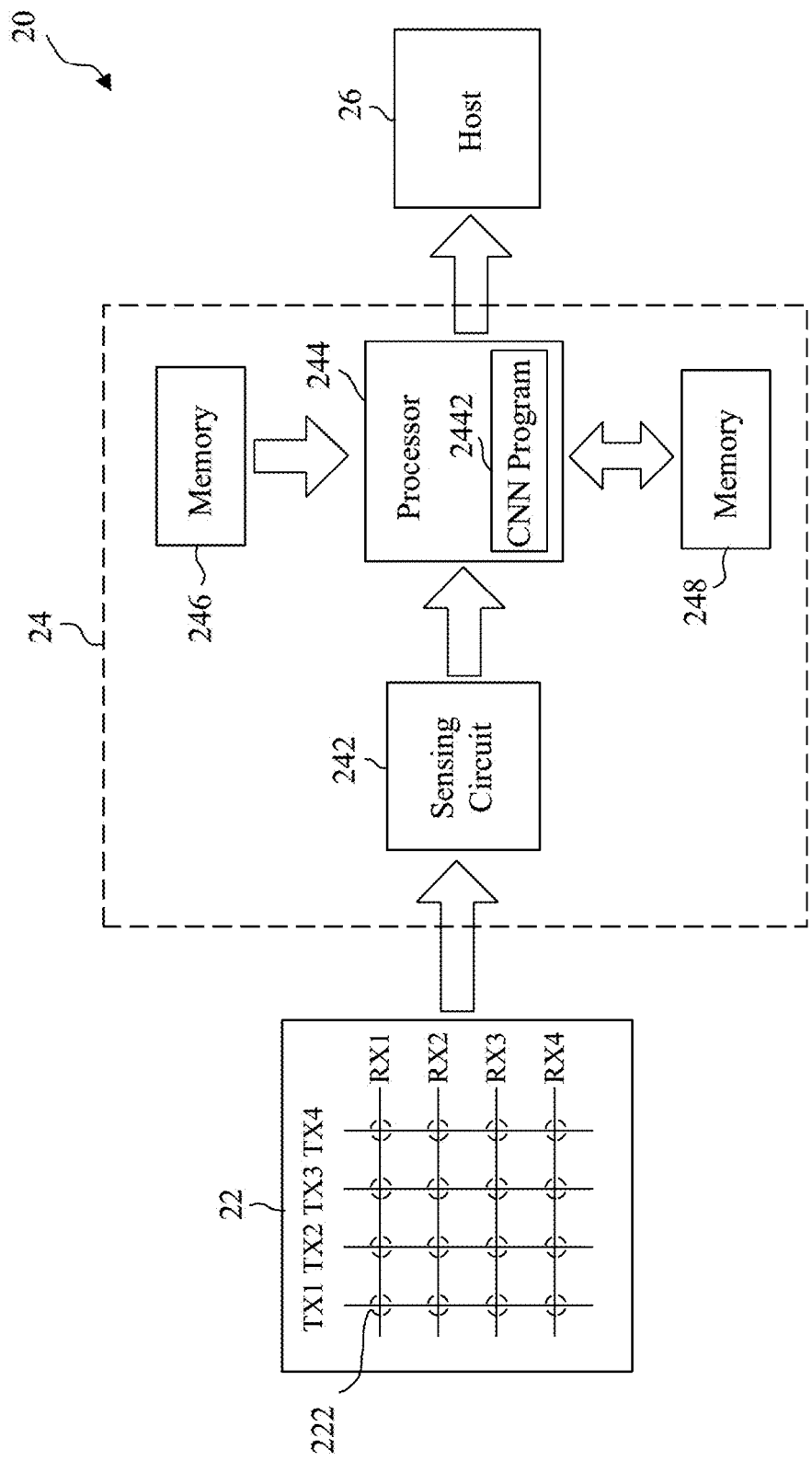
FIG. 5 shows a schematic diagram of a control system in accordance with a first embodiment of the present invention.

Please refer to FIG. 5, which shows a schematic diagram of a control system in accordance with a first embodiment of the present invention. As shown in FIG. 5, a touch device 20 comprises a touch sensor 22 and a control system. The control system comprises a controller 24 and a host 26. In one embodiment, the touch sensor 22 is a capacitive touch sensor and comprises a plurality of electrodes TX1~TX4 as well as RX1~RX4. Sensing points 222 are formed at intersections of the electrodes TX1~TX4 and RX1~RX4. The layout of electrodes TX1~TX4 and RX1~RX4 as shown in FIG. 5 is one embodiment of the touch sensor 22 in the present invention, and the present invention is not limited thereto. The controller 24 comprises a sensing circuit 242, a processor 244, and memories 246, 248. The sensing circuit 242 is electrically connected to the touch sensor 22 for sensing capacitance of the plurality of sensing points 222 of the touch sensor 22 to generate a plurality of sensing values dV. The processor 244 generates a sensing image SP, as shown in FIG. 1~4, according to the plurality of sensing values dV from the sensing circuit 242. The processor 244 is electrically connected to memories 246 and 248. The processor 244 includes a convolutional neural network (CNN) program 2442 which is firmware-implemented. The CNN program 2442 has an inferential ability. The memory 246 stores a parameter Dp for an operation of the CNN program 2442. The memory 246 can be a read-only memory (ROM) or a random access memory (RAM) preloaded with initial values. The memory 246 is not limited to a ROM or a RAM. The parameter Dp is generated by a convolutional neural network training program on a computer in advance. The convolutional neural network training program has the same architecture as the CNN program 2442. The CNN program 2442 needs different parameters Dp while the CNN program 2443 performs different recognition functions. The memory 248 is electrically connected to the processor 244 and stores temporary information or data generated by the CNN program 2442 of the processor 244 in operation. The memory 248 can be but not limited to a RAM. In one embodiment of the present invention, the memory 246 and 248 can alternatively be integrated as one. The host 26 can be a central processing unit (CPU) of an electronic device, such as a central processing unit (CPU), an embedded controller (EC), or a keyboard controller (KBC) of a laptop computer.

Figure 6:
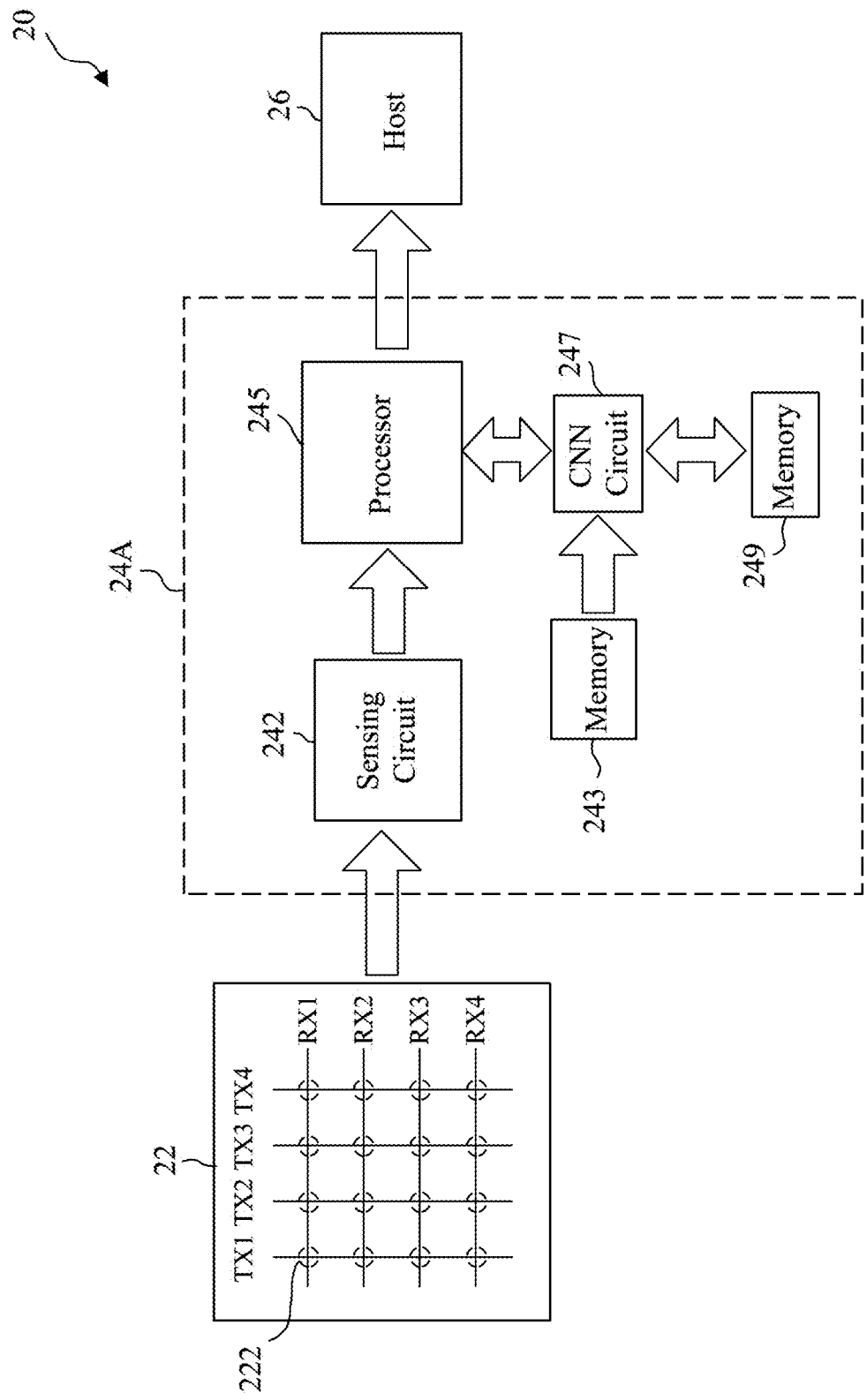
FIG. 6 shows a schematic diagram of a control system in accordance with a second embodiment of the present invention.

FIG. 6 shows a schematic diagram of a control system in accordance with a second embodiment of the present invention. The controller 24 in FIG. 5 is similar to the controller 24A in FIG. 6. In the controller 24A of FIG. 6, the sensing circuit 242 is electrically connected to the touch sensor 22 for sensing the plurality of sensing points 222 of the touch sensor 22 to generate a plurality of sensing values dV. The processor 245 generates a sensing image SP according to the plurality of sensing values dV from the sensing circuit 242. A convolutional neural network (CNN) circuit 247 is electrically connected to the processor 245 and memories 243, 249. The memory 243 stores a parameter Dp for an operation of the CNN circuit 247. The memory 243 can be but not limited to a ROM or a RAM which is preloaded with initial values. The parameter Dp is generated by a convolutional neural network training program on a computer in advance. The convolutional neural network training program has the same architecture as the CNN circuit 247. The CNN circuit 247 needs different parameters Dp while the CNN circuit 247 performs different recognition functions. The memory 249 is electrically connected to the CNN circuit 247 and stores temporary information or data generated by the CNN circuit 247 in operation. The memory 249 can be but not limited to a RAM. In one embodiment of the present invention, the memory 243 and 249 can alternatively be integrated as one.

Figure 7:
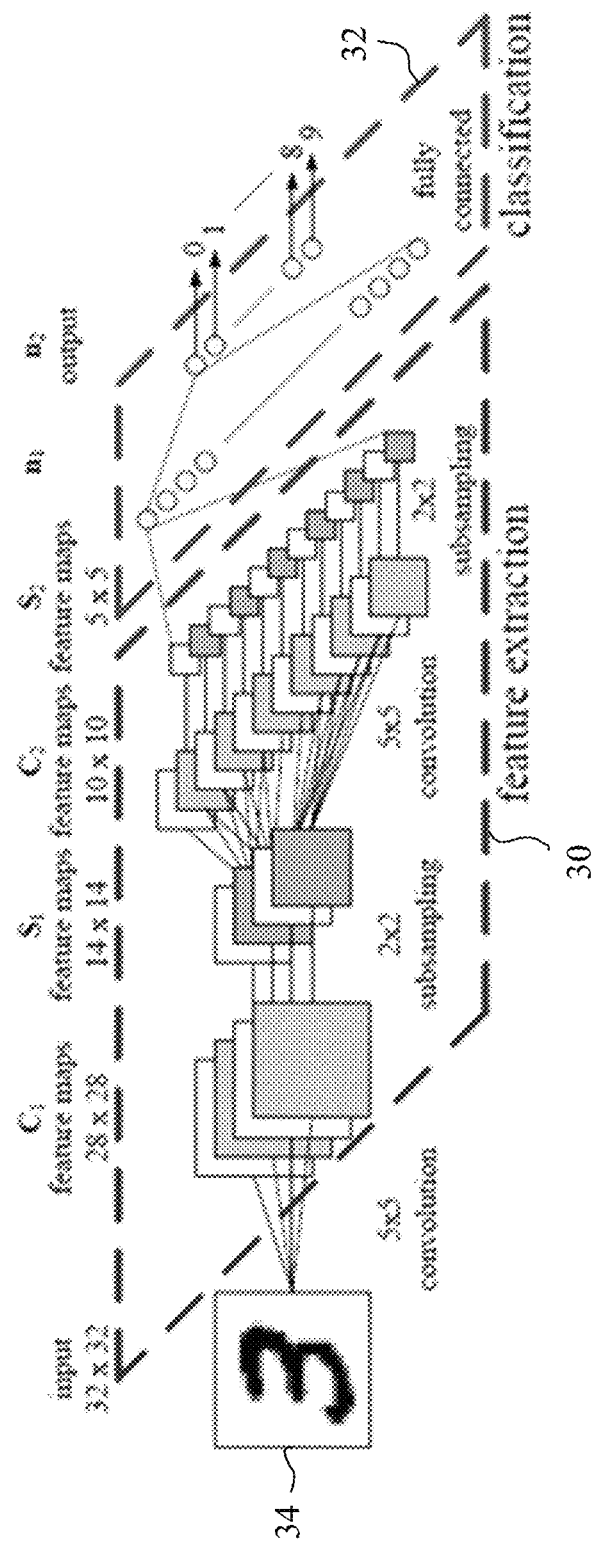
FIG. 7 shows a basic architecture of the convolutional neural network.

The present invention utilizes the CNN to determine a status of the touch sensor 22 or a category of an object in contact with (or adjacent to) the touch sensor 22. In FIG. 5, the CNN program 2442 is a firmware-implemented convolutional neural network. In FIG. 6, the CNN circuit 247 is a hardware-implemented convolutional neural network. Each of the CNN program 2442 and the CNN circuit 247 has a basic CNN architecture as shown in FIG. 7. The basic CNN architecture in FIG. 7 comprises a feature extraction part 30 and a classification part 32. The feature extraction part 30 is used to perform a convolution operation and a subsampling operation. A main function of the convolution operation is to extract features, and a main function of the subsampling operation is to reduce data quantity of an image and retain important information of the image. The classification part 32 performs classification based on the extracted feature information. As shown in FIG. 7, when an image 34 including a number "3" is input into the convolutional neural network, the feature extraction part 30 extracts features of the image 34 to generate a feature information DF. The feature information DF is then provided to the classification part 32 for preforming classification so as to generate an identification information DI. The identification information DI can be used to determine that the number in the image 34 is "3". Taking the recognition of the number "3" as an example, in the process of training the convolutional neural network to recognize the number "3", images of various numbers "3" are provided to the convolutional neural network. After the CNN extracts and obtains the feature information of the images, the feature information will be stored in a numeral feature group. As a result, the convolutional neural network is able to recognize the number "3" in the image according to the feature information in the numeral feature group. Since the convolutional neural network is already a mature technology, the details thereof are omitted. The convolutional neural network used by the present invention can be a standard CNN architecture, or alternatively be an architecture which is modified from CNN. The feature extraction part 30 and the classification part 32 can be implemented by a firmware or a hardware circuit.

Figure 8:
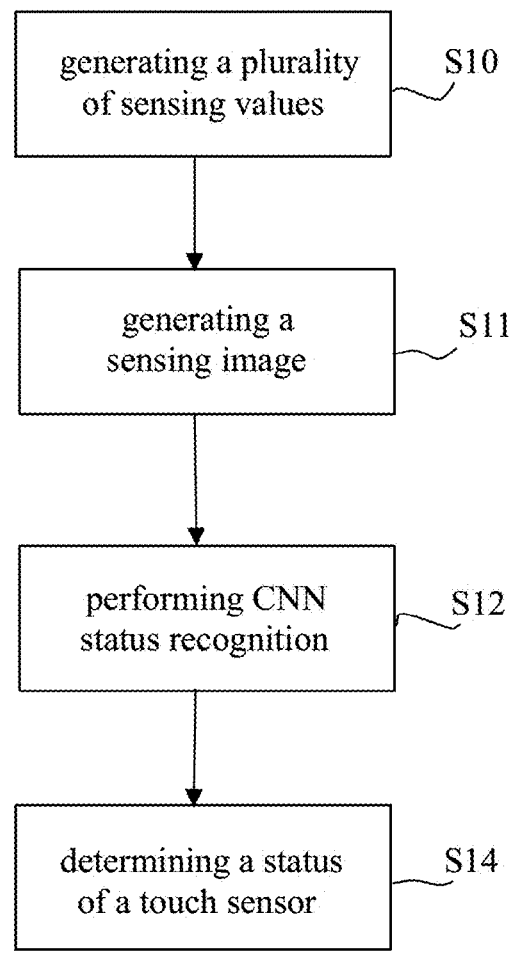
FIG. 8 shows a flow chart of a method for recognizing a status of a touch sensor in accordance with one embodiment of the present invention.
Figure 9:
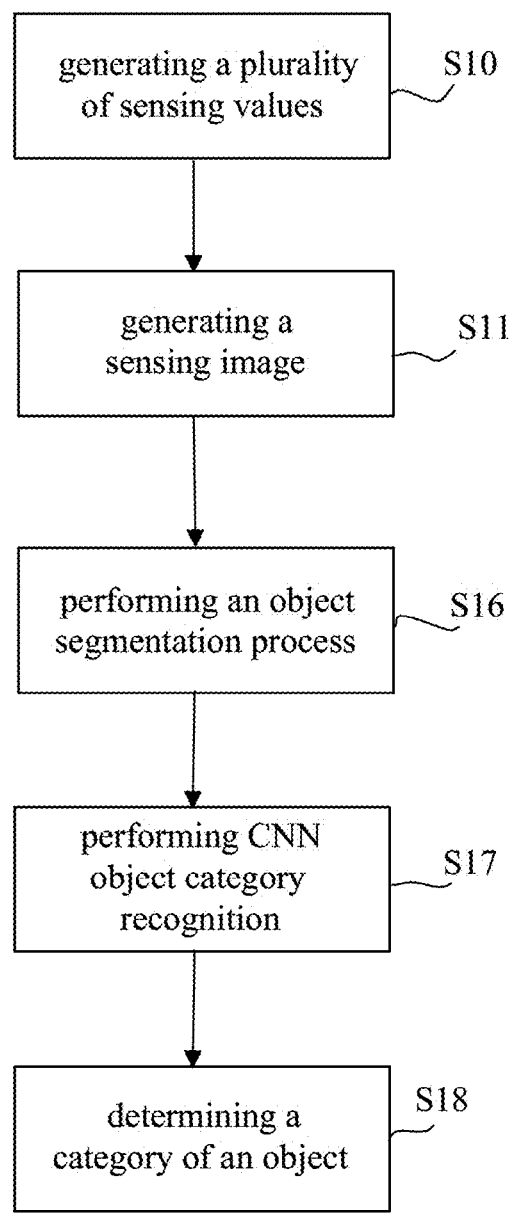
FIG. 9 shows a flow chart of a method for recognizing a category of an object which is in contact with (or adjacent to) the touch sensor in accordance with one embodiment of the present invention.

In the following, flow charts in FIG. 8 and FIG. 9 are described with reference to the control system in FIG. 5.

FIG. 8 shows a flow chart of a method for recognizing a status of a touch sensor in accordance with one embodiment of the present invention. Please refer to FIG. 8, in which steps S10 and S11 are for obtaining a sensing image of the touch sensor 22 of the touch device 20. In step S10, the sensing circuit 242 of the controller 24 senses the touch sensor 22 to generate a plurality of sensing values dV. Then, the processor 244 generates a sensing image SP according to the plurality of sensing values dV from the sensing circuit 242, as shown in step S11. The sensing image SP comprises the plurality of sensing values dV of the sensing points 222 of the touch sensor 22. After the sensing image SP is obtained, a step S12 is performed.

In step S12, the CNN program 2442 recognizes a status of the touch sensor 22 based on the sensing image SP. In the step S12, the CNN program 2442 processes the sensing image SP to generate feature information DF1 and generate identification information DI1 according to the feature information DF1. In step S14, the processor 244 determines a status of the touch sensor 22 according to the identification information DI1. For instance, the identification information DI1 generated by the CNN program 2442 indicates 10% of probability that there may be water on the touch sensor 22 and 90% of probability that the touch sensor 22 may be disturbed by noise. It is obvious that the probability that the touch sensor 22 is disturbed by noise is much higher. As a result, the processor 244 is able to determine that a status of the touch sensor is noise-disturbed according to the identification information DI1. Then, the processor 244 can perform corresponding actions, such as limiting to single-finger operation or changing the frequency of the drive signals applied to the touch sensor 22.

In order to perform the flow chart in FIG. 8, it is necessary to provide a convolutional neural network training program (CNN training program) CT1 on a computer in advance. The CNN training program CT1 has the same architecture as the CNN program 2442, and the CNN training program CT1 is implemented by a programming language as well. In order to make the CNN program 2442 has ability to recognize a variety of status of the touch sensor, such as noise-disturbed, floating, having water drop, and etc., it is necessary to pre-train the CNN training program CT1 so as to obtain the parameters required by the CNN program 2442 for recognition. Take the training of the CNN training program CT1 to recognize the noise-disturbed status of the touch sensor 22 as an example. The training process includes providing noises to the touch sensor 22 for many times, and the location, intensity, or range of the noise being applied each time is different. Since the touch sensor 22 is disturbed by multiple times of noise, the processor 244 is able to obtain a variety of sensing images SP, in which each sensing image SP has different sensing values distribution. These sensing images SP are transmitted to the CNN training program CT1 for extraction so as to generate the parameter Dp required by the CNN program 2442 to obtain the feature information DF1 and the identification information DI1. The parameter Dp is stored in the memory 246 and is for the CNN program 2442 to recognize the status of the touch sensor 22. As a result, the CNN program 2442 has the ability to recognize if the touch sensor 22 is in a noise-disturbed status. Similarly, the CNN training program CT1 can also be trained to recognize other status of the touch sensor 22, so the CNN program 2442 has the ability to recognize even more various status of the touch sensor 22. Since the training processes are similar, the details thereof are omitted.

FIG. 9 shows a flow chart of a method for recognizing a category of an object in contact with (or adjacent to) the touch sensor 22 in accordance with one embodiment of the present invention, in which steps S10 and S11 are identical to those in FIG. 8. In step S16, the processor 244 performs an object segmentation process to the sensing image SP to determine at least one sub-image. The object segmentation process is to determine one or more object regions from the sensing image SP first, and then determines a sub-image based on each of the object regions. The sub-image comprises an image of the object region. In other words, the sub-image is a part of the sensing image SP and includes a plurality of sensing values. For example, after a sensing image SP in responsive to two objects contacting with the touch sensor 22 is processed by the object segmentation, the processor 244 defines two object regions from the sensing image SP and determine two sub-images according to these two object regions, and each of the sub-images comprises an image of one object region.

In step S17, the CNN program 2442 recognizes a category of the object in contact with (or adjacent to) the touch sensor 22 according to the sub-image determined in step S16. In step S17, the CNN program 2442 processes the sub-image to generate feature information DF2 and generate identification information DI2 according to the feature information DF2. If there are two sub-images, the CNN program 2442 has to process these two sub-images so as to generate two pieces of feature information DF2 as well as two pieces of identification information DI2. In step S18, the processor 244 determines a category of the object according to each of the identification information DI2. For instance, the identification information DI2 indicates 90% of probability that the object category is water, 7% of probability that the object category is finger, and 3% of probability that the object category is stylus. It is obvious that the probability that the object category is water is particularly high. As a result, the processor 244 determines that the object on the touch sensor 22 is water according to the identification information DI2. If there are two identification information DI2, the processor 244 determines each object category based on each identification information DI2. After determining object category, the processor 244 can perform corresponding actions. For instance, the processor 244 will not calculate and output coordinates when the contacted object is water, or the processor 244 will adjust gain of the sensing circuit 242 while the contacted object is a touch stylus.

In order to perform the flow chart in FIG. 9, it is necessary to pre-train the CNN program 2442 in advance for recognizing a variety of category of the object, such as finger, water drop, touch stylus, and etc. Take the training of the CNN program 2442 to recognize water as an example. The training process includes providing water drops of various sizes on the touch sensor 22 for many times, and each time the location and shape of the provided water drop are different. Since the touch sensor 22 is provided with water drops for many times, the processor 244 is able to obtain a variety of sensing images SP, in which each sensing image has different sensing values distribution. These sensing images SP are then transmitted to the CNN training program CT2 for extraction so as to generate the parameter Dp required by the CNN program 2442 to obtain the feature information DF2 and the identification information DI2. The extracted parameter Dp is stored in the memory 246 and is for the CNN program 2442 to recognize the object category. As a result, the CNN program 2442 has the ability to recognize water. Similarly, the CNN training program CT2 can also be trained to recognize other object category, so the CNN program 2442 has the ability to recognize even more various objects. Since the training processes thereto are similar, the details are omitted.

The method provided in FIG. 8 and FIG. 9 can also be implemented through the structure in FIG. 6. In details, the step S12 can be performed through the processor 245 controlling the operations of the CNN circuit 247. As such, it can be understood that the step S12 is performed by a convolutional neural network to process the sensing image SP so as to generate feature information DF1 and generate identification information DI1 according to the feature information DF1. The step S17 may also be performed through the processor 245 controlling the operations of the CNN circuit 247. As such, it can be understood that, the step S17 is performed by a convolutional neural network to process the sub-image so as to generate feature information DF2 and generate identification information DI2 according to the feature information DF2.

In one embodiment of the present invention, the processor 244 (or 245) can further perform a pre-processing process to the sensing image SP after the sensing image SP is generated in the step S11. The pre-processing process comprises, and yet not limited to, processing noise or compensating abnormal values. And then steps S12 or S16 can be performed based on the pre-processed sensing image SP.

In one embodiment of the present invention, the controller 24 in FIG. 5 or the controller 24A in FIG. 6 can be an integrated circuit (IC) device.

According to the present invention, as long as the convolutional neural network training program can be trained with sufficient sensing images SP in advance to generate the required parameters for recognition and the required parameters are stored in the memory (246 or 243), the controller 24 (or 24A) is able to recognize a category of the contact object or a status of the touch sensor based on the sensing images. As a result, the present invention is advantageous of both simplicity and high recognition accuracy.

Figure 10:
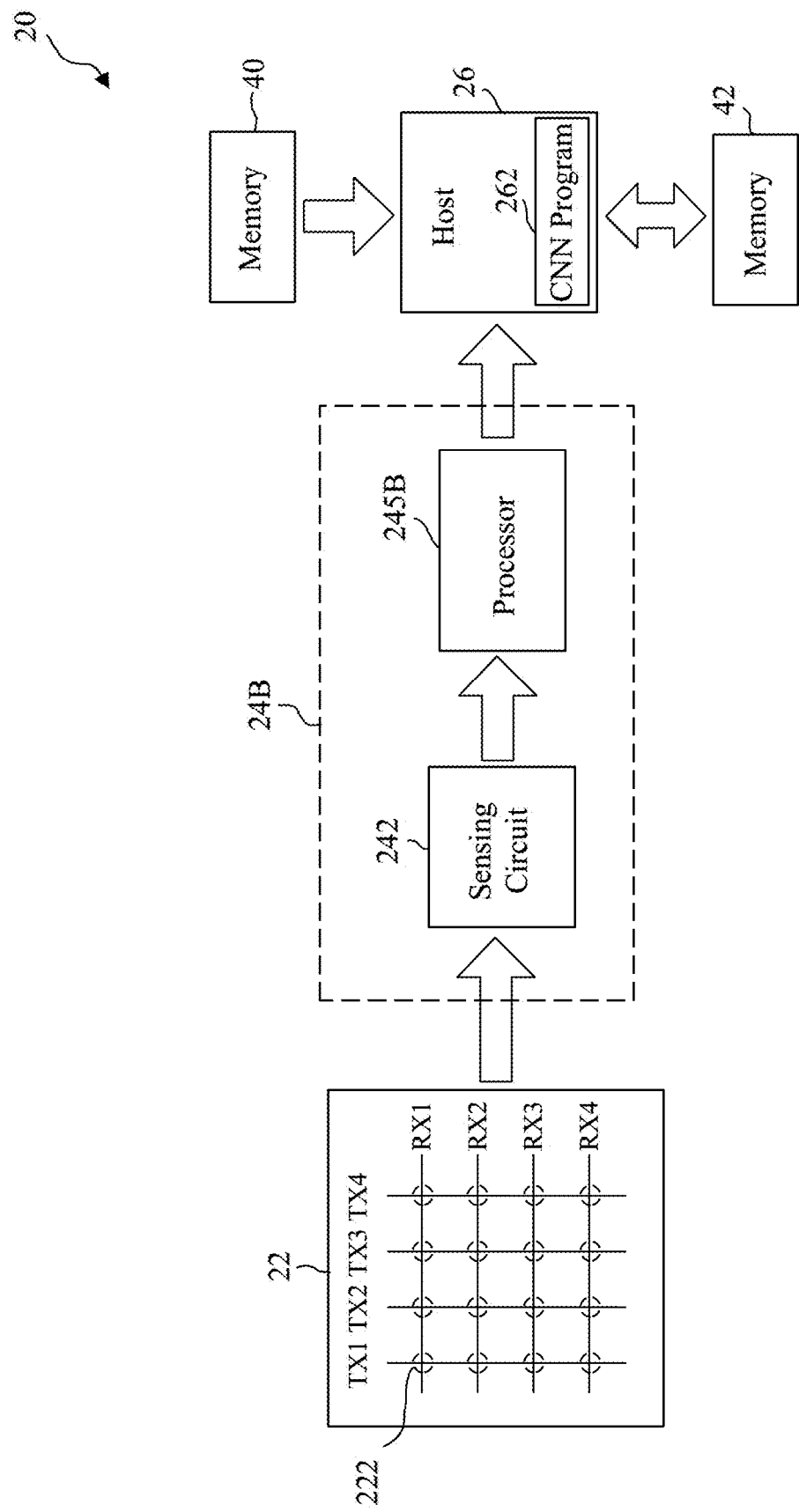
FIG. 10 shows a schematic diagram of a control system in accordance with a third embodiment of the present invention.

Please refer to FIG. 10, which shows a schematic diagram of a control system in accordance with a third embodiment of the present invention. As shown in FIG. 10, the control system comprises a controller 24B, a host 26, a memory 40 and a memory 42. The controller 24B comprises a sensing circuit 242 and a processor 245B. The controller 24B can be an integrated circuit (IC) device. The sensing circuit 242 is electrically connected to the touch sensor 22 for sensing capacitance of a plurality of sensing points 222 of the touch sensor 22 to generate a plurality of sensing values dV. The processor 245B generates a sensing image SP according to the plurality of sensing values dV from the sensing circuit 242. The host 26 is electrically connected to the processor 245B, the memory 40 and the memory 42. The host 26 includes a CNN program 262 which is firmware-implemented. The memory 40 is electrically connected to the host 26 to store a parameter Dp for an operation of the CNN program 262. The memory 40 can be but not limited to a ROM or a RAM which is preloaded with initial values. The parameter Dp is generated by a convolutional neural network training program on a computer in advance. The convolutional neural network training program has the same architecture as the CNN program 262. The CNN program 262 needs different parameters DP while the CNN program 262 performs different recognition functions. The memory 42 is coupled to the host 26 and stores temporary information or data generated by the CNN program 262 in operation. The memory 42 can be but not limited to a RAM. In one embodiment of the present invention, the memory 40 and the memory 42 can alternatively be integrated as one. In one embodiment, the memory 40 can be a ROM or a flash memory in the host 26, and the memory 42 can be a RAM in the host 26. The host 26 can be a CPU, EC or KBC of an electronic device.

Figure 11:
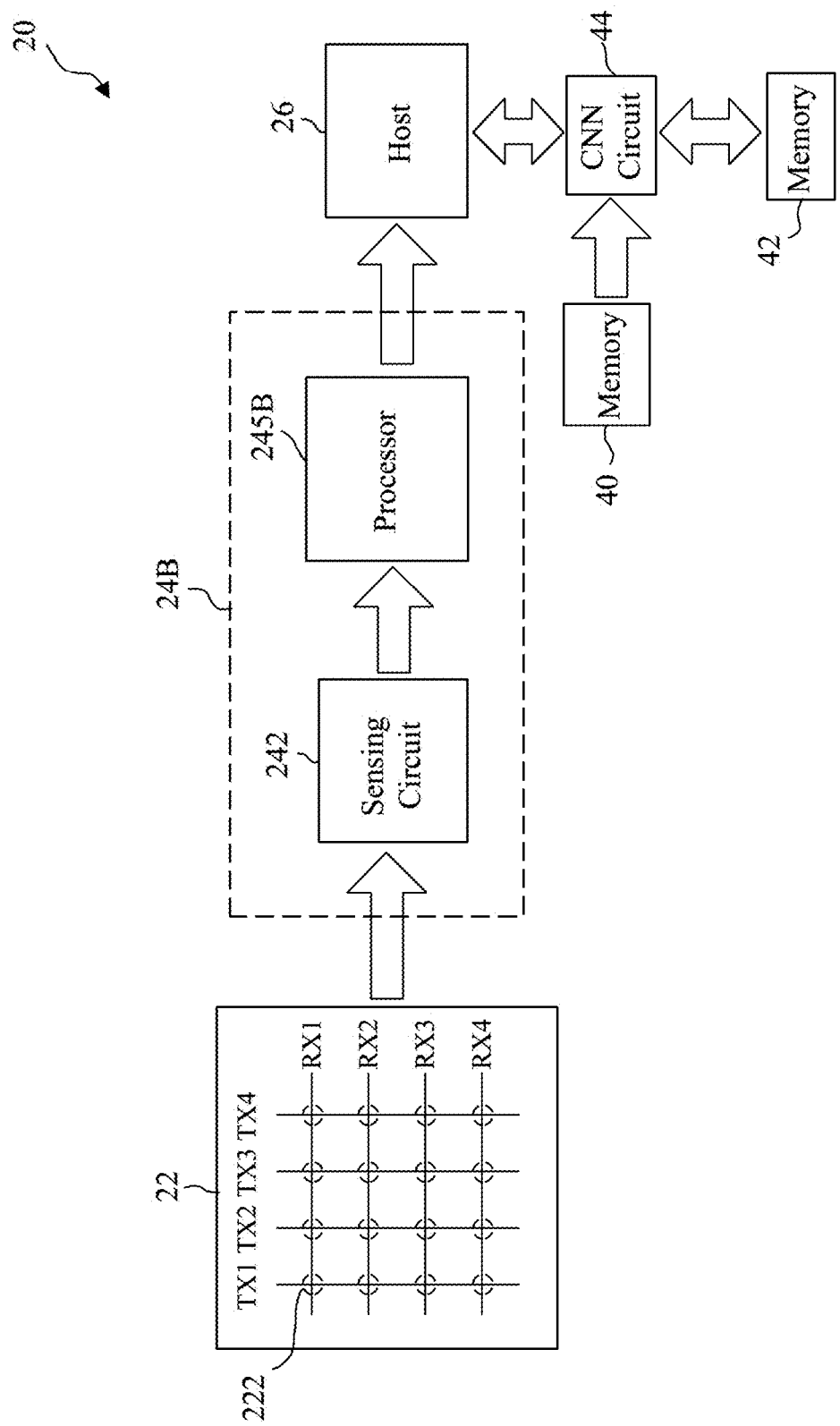
FIG. 11 shows a schematic diagram of a control system in accordance with a fourth embodiment of the present invention.

FIG. 11 shows a schematic diagram of a control system in accordance with a fourth embodiment of the present invention. The control system in FIG. 11 is similar to the control system in FIG. 10, which comprises the controller 24B, the host 26, the memory 40 and the memory 42. What differs is that, the control system in FIG. 11 further comprises a CNN circuit 44. The CNN circuit 44 is a hardware-implemented convolutional neural network. The CNN circuit 44 is coupled to the host 26, the memory 40 and the memory 42. The memory 40 stores a parameter Dp for an operation of the CNN circuit 44. The parameter Dp is generated by a convolutional neural network training program on a computer in advance. The convolutional neural network training program has the same architecture as the CNN circuit 44. The CNN circuit 44 needs different parameters Dp while the CNN circuit 44 performs different recognition functions. The memory 42 is coupled to the CNN circuit 44 for storing temporary information or data generated by the CNN circuit 44 in operation. In one embodiment of the present invention, the CNN circuit 44 can alternatively be integrated into the host 26.

The CNN program 262 in FIG. 10 and the CNN circuit 44 in FIG. 11 are similar to the CNN program 2442 in FIG. 5 and the CNN circuit 247 in FIG. 6, respectively. The basic architecture of the CNN program 262 and the CNN circuit can be referred to FIG. 7 and description thereof.

The method provided in FIG. 8 and FIG. 9 can also be implemented by the structure in FIG. 10. Please refer to FIG. 8 and FIG. 10. In step S10, the sensing circuit 242 of the controller 24B senses the touch sensor 22 to generate a plurality of sensing values dV. Then, the processor 245B generates a sensing image SP according to the plurality of sensing values dV from the sensing circuit 242, as shown in step S11. The sensing image SP comprises the plurality of sensing values dV of the sensing points 222 of the touch sensor 22. After the sensing image SP is obtained, the processor 245B transmits the sensing image SP to the host 26 so as to perform the step S12.

In the step S12, the CNN program 262 recognizes a status of the touch sensor 22 based on the sensing image SP. In the step S12, the CNN program 262 of the host 26 processes the sensing image SP to generate feature information DF1 and generate identification information DI1 according to the feature information DF1. In step S14, the host 26 determines a status of the touch sensor 22 according to the identification information DI1. The recognition and training mechanisms of the CNN program 262 are the same as those of the CNN program 2442 in FIG. 5, hence the details thereof are omitted.

After the status of the touch sensor 22 is determined in step S14, the host 26 can inform the controller 24B of the determination result, such that the controller 24B can perform corresponding process according to the status of the touch sensor 22. For example, when it is determined that there is water or noise on the touch sensor 22, the controller 24B adjusts the parameters which are used to process the sensing image SP, or alternatively the controller 24B gives instructions to the sensing circuit 242 to modify the scanning method or driving frequency to scan the touch sensor 22. The scanning method may comprise, and yet not limited to a capacitive self scanning and a capacitive mutual scanning.

Please refer to FIG. 9 and FIG. 10. In step S10, the sensing circuit 242 of the controller 24B senses the touch sensor 22 to generate a plurality of sensing values dV. Then, the processor 245B generates a sensing image SP according to the plurality of sensing values dV from the sensing circuit 242, as shown in step S11. The sensing image SP comprises the plurality of sensing values dV of the sensing points 222 of the touch sensor 22. In step S16, after the processor 245B obtains the sensing image SP, the processor 245B performs an object segmentation process to the sensing image SP to determine at least one sub-image. Next, the processor 245B transmits the at least one sub-image to the host 26. In one embodiment, the step S16 may also be that the host 26 performs the object segmentation process to the sensing image SP to determine at least one sub-image after the processor 245B transmits the sensing image SP to the host 26. Since the object segmentation process has been described earlier, the details thereof are omitted herein.

In step S17, the CNN program 262 recognizes a category of an object in contact with (or adjacent to) the touch sensor 22 according to the sub-image determined in step S16. In step S17, the CNN program 262 processes the sub-image to generate feature information DF2 and generate identification information DI2 according to the feature information DF2. If there are two sub-images, the CNN program 262 has to process these two sub-images so as to generate two pieces of feature information DF2 as well as two pieces of identification information DI2. In the step S18, the host 26 determines a category of the object according to each of the identification information DI2. The object determination and training mechanisms of the CNN program 262 are the same as those of the CNN program 2442 in FIG. 5, hence the details thereof are omitted.

The method provided in FIG. 8 and FIG. 9 can also be implemented by the structure in FIG. 11. In details, the step S12 can be performed through the host 26 controlling the operations of the CNN circuit 44. As such, it can be understood that the step S12 is performed by a convolutional neural network to process the sensing image SP so as to generate feature information DF1 and generate identification information DI1 according to the feature information DF1. The step S17 may also be performed through the host 26 controlling the operations of the CNN circuit 44. As such, it can be understood that, the step S17 is performed by a convolutional neural network to process the sub-image so as to generate feature information DF2 and generate identification information DI2 according to the feature information DF2.

In one embodiment of the present invention, the processor 245B can further perform a pre-processing process to the sensing image SP after the sensing image SP is generated in the step S11. The pre-processing process comprises, and yet not limited to, processing noise or compensating abnormal values. And then steps S12 or S16 can be performed based on the pre-processed sensing image SP.

As a result, according to the present invention, as long as the convolutional neural network training program can be trained with sufficient sensing images SP in advance, the host 26 is able to recognize a category of the contact object or a status of the touch sensor based on the sensing images. Therefore, the present invention is advantageous of both simplicity and high recognition accuracy.

The embodiments described above are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention. And the present invention cover modifications and variations thereof this invention since they fall within the scope of the invention and its equivalent.

What is claimed is:

1. A control system for a touch device which includes a touch sensor, comprising:
a sensing circuit, configured to sense the touch sensor and generate a plurality of sensing values;
a processor, electrically connected to the sensing circuit and configured to generate a sensing image according to the plurality of sensing values; and
a convolutional neural network, configured to process the sensing image to generate feature information and generate identification information according to the feature information;
wherein the processor determines a status of the touch sensor according to the identification information.

2. The control system according to claim 1, wherein the convolutional neural network is implemented by a firmware of the processor.

3. The control system according to claim 1, wherein the convolutional neural network is implemented by a hardware circuit.

4. The control system according to claim 2, further comprising a memory coupled to the processor and configured to store a parameter for an operation of the convolutional neural network.

5. The control system according to claim 3, further comprising a memory coupled to the convolutional neural network and configured to store a parameter for an operation of the convolutional neural network.

6. The control system according to claim 1, wherein the processor further performs a pre-processing process to the sensing image, the pre-processing process comprises processing noise or compensating abnormal values, and the processor provides the sensing image which has been processed with the pre-processing process to the convolutional neural network for generating the identification information.

7. A control system for a touch device which includes a touch sensor, comprising:
a sensing circuit, configured to sense the touch sensor and generate a plurality of sensing values;
a processor, electrically connected to the sensing circuit and configured to generate a sensing image according to the plurality of sensing values, wherein the processor further performs an object segmentation process to the sensing image to determine a sub-image; and
a convolutional neural network, configured to process the sub-image to generate feature information and generate identification information according to the feature information;
wherein the processor determines a category of an object according to the identification information.

8. The control system according to claim 7, wherein the convolutional neural network is implemented by a firmware of the processor.

9. The control system according to claim 7, wherein the convolutional neural network is implemented by a hardware circuit.

10. The control system according to claim 8, further comprising a memory coupled to the processor and configured to store a parameter for an operation of the convolutional neural network.

11. The control system according to claim 9, further comprising a memory coupled to the convolutional neural network and configured to store a parameter for an operation of the convolutional neural network.

12. The control system according to claim 7, wherein the processor further performs a pre-processing process to the sensing image before the object segmentation process, and the pre-processing process comprises processing noise or compensating abnormal values.

13. A control system for a touch device which includes a touch sensor, comprising:
  a sensing circuit, configured to sense the touch sensor and generate a plurality of sensing values;
  a processor, electrically connected to the sensing circuit and configured to generate a sensing image according to the plurality of sensing values;
  a convolutional neural network, configured to process the sensing image to generate feature information and generate identification information according to the feature information; and
  a host, coupled to the processor to receive the sensing image, wherein the host determines a status of the touch sensor according to the identification information.

14. The control system according to claim 13, wherein the host is a central processing unit, an embedded controller, or a keyboard controller.

15. The control system according to claim 13, wherein the convolutional neural network is implemented by a firmware of the host.

16. The control system according to claim 13, wherein the convolutional neural network is implemented by a hardware circuit.

17. The control system according to claim 16, wherein the convolutional neural network is integrated into the host.

18. The control system according to claim 15, further comprising a memory coupled to the host and configured to store a parameter for an operation of the convolutional neural network.

19. The control system according to claim 16, further comprising a memory coupled to the convolutional neural network and configured to store a parameter for an operation of the convolutional neural network.

20. The control system according to claim 13, wherein the processor further performs a pre-processing process to the sensing image, the pre-processing process comprises processing noise or compensating abnormal values, and the processor provides the sensing image which has been processed with the pre-processing process to the convolutional neural network for generating the identification information.

21. A control system for a touch device which includes a touch sensor, comprising:
  a sensing circuit, configured to sense the touch sensor and generate a plurality of sensing values;
  a processor, electrically connected to the sensing circuit and configured to generate a sensing image according to the plurality of sensing values;
  a convolutional neural network, configured to process a sub-image to generate feature information and generate identification information according to the feature information; and
  a host, coupled to the processor and determining a category of an object according to the identification information;
  wherein the host or the processor performs an object segmentation process to the sensing image to generate the sub-image.

22. The control system according to claim 21, wherein the host is a central processing unit, an embedded controller, or a keyboard controller.

23. The control system according to claim 21, wherein the convolutional neural network is implemented by a firmware of the host.

24. The control system according to claim 21, wherein the convolutional neural network is implemented by a hardware circuit.

25. The control system according to claim 24, wherein the convolutional neural network is integrated into the host.

26. The control system according to claim 23, further comprising a memory coupled to the host and configured to store a parameter for an operation of the convolutional neural network.

27. The control system according to claim 24, further comprising a memory coupled to the convolutional neural network and configured to store a parameter for an operation of the convolutional neural network.

28. The control system according to claim 21, wherein the processor further performs a pre-processing process to the sensing image before the sensing image is processed with the object segmentation process, and the pre-processing process comprises processing noise or compensating abnormal values.

29. A method applicable to a touch device, comprising:
  (a) obtaining a sensing image of a touch sensor of the touch device, wherein the sensing image comprises a plurality of sensing values;
  (b) processing the sensing image by a convolutional neural network to generate feature information and generate identification information according to the feature information; and
  (c) determining a status of the touch sensor according to the identification information.

30. The method according to claim 29, further comprising performing a pre-processing process to the sensing image before the step (b), wherein the pre-processing process comprises processing noise or compensating abnormal values.

31. A method applicable to a touch device, comprising:
  (a) obtaining a sensing image of a touch sensor of the touch device, wherein the sensing image comprises a plurality of sensing values;
  (b) performing an object segmentation process to the sensing image to determine a sub-image;
  (c) processing the sub-image by a convolutional neural network to generate feature information and generate identification information according to the feature information; and
  (d) determining a category of an object according to the identification information.

32. The method according to claim 31, further comprising performing a pre-processing process to the sensing image before the step (b), wherein the pre-processing process comprises processing noise or compensating abnormal values.

* * * * *